US011518421B1

(12) United States Patent
Kirsten et al.

(10) Patent No.: US 11,518,421 B1
(45) Date of Patent: Dec. 6, 2022

(54) RAILCAR AIRBRAKE SYSTEM FOR ATTACHMENT TO MACHINERY

(71) Applicant: S.A.S. of Luxemburg, LLC, Luxemburg, WI (US)

(72) Inventors: Mark J. Kirsten, Kewaunee, WI (US); Tyler G. Vincent, Green Bay, WI (US); Colten D. Jensen, Green Bay, WI (US)

(73) Assignee: S.A.S. of Luxemburg, LLC, Luxemburg, WI (US)

(*) Notice: Subject to any disclaimer, the term of this patent is extended or adjusted under 35 U.S.C. 154(b) by 449 days.

(21) Appl. No.: 16/897,731

(22) Filed: Jun. 10, 2020

(51) Int. Cl.
*B61H 13/20* (2006.01)
*B61G 5/08* (2006.01)
*B61H 13/34* (2006.01)
*B60T 13/38* (2006.01)

(52) U.S. Cl.
CPC ............. *B61H 13/20* (2013.01); *B60T 13/38* (2013.01); *B61G 5/08* (2013.01); *B61H 13/34* (2013.01)

(58) Field of Classification Search
CPC ......... B61H 13/20; B61H 13/34; B60T 13/38; B61G 5/08; B61G 1/30
See application file for complete search history.

(56) References Cited

U.S. PATENT DOCUMENTS

| 3,198,137 A * | 8/1965 | White, Jr. | B60F 1/043 |
| | | | 105/72.2 |
| 3,388,928 A * | 6/1968 | Poker | B61G 7/08 |
| | | | 280/468 |
| 3,922,007 A * | 11/1975 | Friedebach | B61J 3/12 |
| | | | 280/456.1 |

OTHER PUBLICATIONS

A brochure of a SAS Railroad Coupler.
A printout of a Mitchell Equipment webpage, www.mitchell-railgear.com/product-listing/5094/61 illustrating a Manual Rear Mount Railcar Coupler.

* cited by examiner

*Primary Examiner* — Xuan Lan Nguyen
(74) *Attorney, Agent, or Firm* — Donald J. Ersler

(57) ABSTRACT

A railcar airbrake system for attachment to or integration into machinery, such as a wheel loader preferably includes a rail car coupler, a glad hand air hose, a compressor, an air storage tank and a sliding base frame. The sliding base frame preferably includes a plurality of top and bottom supports, a base support plate, top and bottom cross members, a coupler slide device and two vertical support posts. The railcar coupler and the glad hand air hose are retained in the coupler slide device. The plurality of supports, the cross members, plate and posts are used to create a structure, which incorporates the slide base frame. The air storage tank and the compressor are secured to the base support plate. The compressor supplies compressed air to the air storage tank. The air storage tank supplies compressed air to the glad hand air hose.

18 Claims, 8 Drawing Sheets

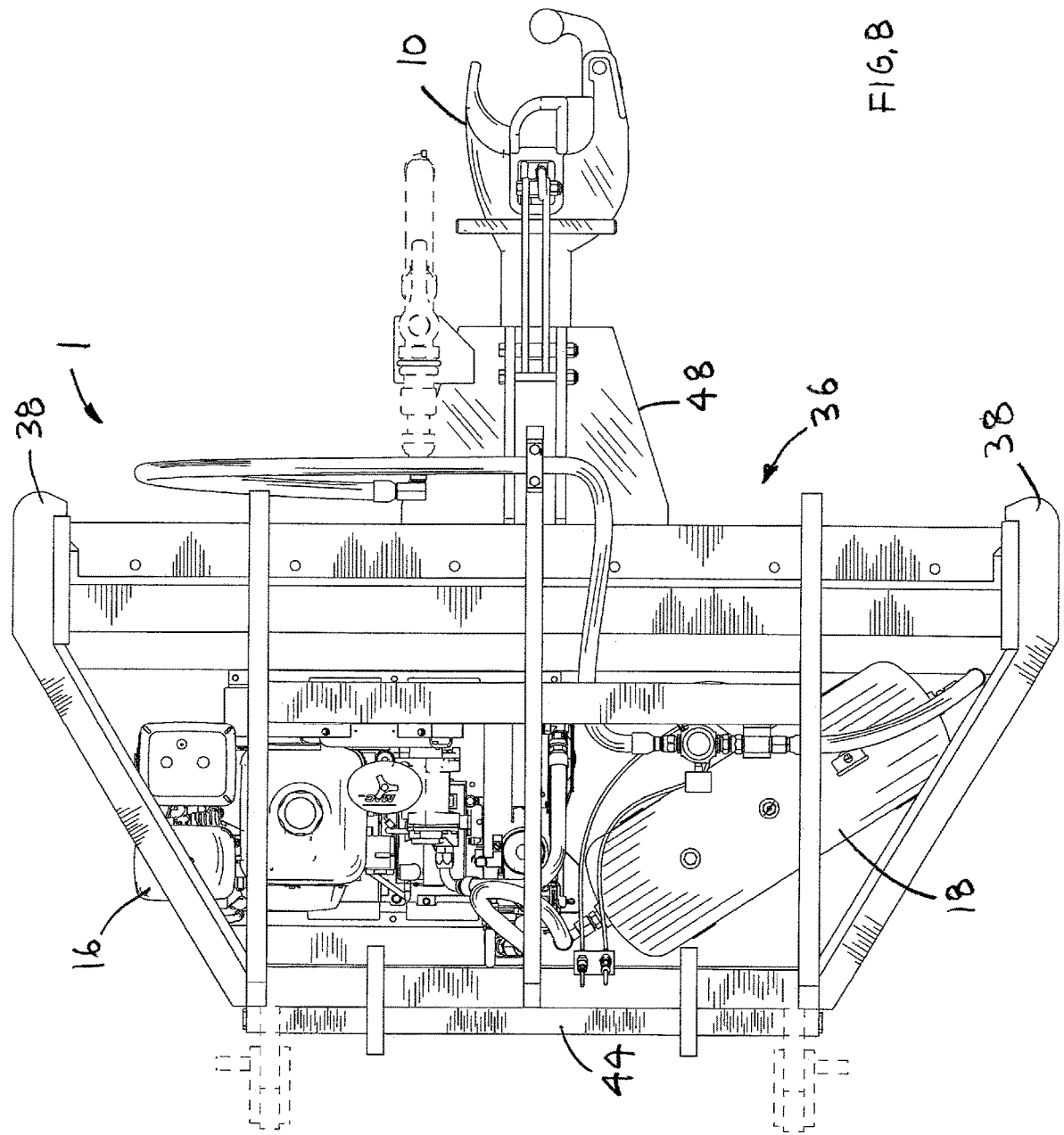

RAILCAR AIRBRAKE SYSTEM FOR ATTACHMENT TO MACHINERY

BACKGROUND OF THE INVENTION

1. Field of the Invention

The present invention relates generally to railcars and more specifically to a railcar airbrake system for attachment to machinery, which enables equipment such as wheel loaders, tractors and other mobile machines to control the brake system of railcar to move thereof on private property.

2. Discussion of the Prior Art

Grain elevators, manufacturers of house roof singles, gravel aggregate producers or users and other such industries that use rail for transportation of materials often utilize a rail spur which is built along, side main railway tracks to provide for temporary parking of railcars for the purpose of loading and unloading materials. Large operations may use a 'TrackMobile' or locomotive to move railcars within the rail spur length to specific loading/unloading areas. Small operations are unable to economically invest in such large machinery, therefore alternatively these operations may presently use a wheel loader, farm tractor, forklift, telehandler or other similar motorized machinery to move the railcars. Presently small operations may be simply manually releasing railcar(s) brakes and pushing railcar(s) with a bucket or forks or fastening a chain to railcar. In the case of any of the above described actions, the operator does not have a fixed confident connection between the railcar and wheel loader or tractor. Also there is no ability for the operator to apply the brakes of the railcars, both are safety concerns.

Presently there are attachments that can be temporarily or permanently mounted to the front or rear of a wheel loader, tractor, forklift, telehandler or similar motorized machinery. These attachments provide an interface between the mobile equipment and railcar with a Railroad Knuckle Coupler manufactured for front mount or rear mount. Front mount attachments most commonly are in the market without air brake system option. One manufacture, Mitchell Equipment, offers a rear attachment option with an air brake system, which must be fastened to a rear of the machinery. Devices which are attached to a rear of machinery are frequently damaged, when the machinery is backed-up.

Accordingly, there is a clearly felt need in the art for a railcar airbrake system attachment to machinery, which is selectively detachable from a front of motorized machinery and includes an integral railcar airbrake system.

SUMMARY OF THE INVENTION

The present invention provides a railcar airbrake system attachment to machinery, which is mounted to a front of motorized machinery and includes an integral railcar airbrake system. The railcar airbrake system attachment to machinery (railcar airbrake system) preferably includes a rail car coupler, a glad hand air hose connection, a compressor, an air storage tank, a sliding base frame and a pair quick mount members. The railcar coupler includes a lower shelf extending from a bottom of the rail car coupler and an upper shelf extending from a top of the rail car coupler. The upper and lower shelfs prevent disconnection between the motorized machinery and the railcar.

The sliding base frame preferably includes a compressor retention structure and a coupler slide device. The compressor retention structure preferably includes a pair of opposing bottom end supports, a plurality of bottom supports, a base support plate, a bottom cross member, a coupler slide device, a pair of opposing top end supports, a plurality of top supports, a pair of vertical support posts and a top cross member. The rail car coupler and the glad hand air hose connection are retained in the coupler slide device. The coupler slide device may be purchased from SAS Forks of Luxemburg, WI.

One end of the plurality of bottom supports are attached to the bottom cross member and one end of the pair of opposing bottom end supports are attached to opposing ends of the bottom cross member. An opposing end of the plurality of bottom supports are attached to opposing ends of the coupler slide device. The base support plate is attached to a top of the plurality of bottom supports and the pair of opposing bottom end supports. The pair of vertical support posts extend upward from the bottom cross member. The top cross member is attached to a top of the pair of vertical support posts. One end of the plurality of top supports are attached to the top cross member. The pair of quick mount members are attached to a rear of the pair of vertical support posts. One end of the pair of opposing top end supports are attached to the end of the plurality of top supports or to opposing ends of the top cross member. The opposing ends of the plurality of top supports are attached to the coupler slide device and opposing ends of the pair of opposing top end supports are attached to opposing ends of the coupler side device.

The air storage tank and the compressor are secured to the base support plate. The compressor includes a compressor motor, which rotates the compressor. The compressor motor is preferably a self-contained internal combustion engine. The compressor supplies compressed air to the air storage tank. The air storage tank supplies compressed air to the glad hand air hose connection. The gland hand air hose is actuated via controls in a machinery cab by an operator. The gland hair air hose outputs direct regulated compressed air to unlock the brakes on a railcar.

Accordingly, it is an object of the present invention to provide a railcar airbrake system, which is selectively detachable from a front of motorized machinery and includes an integral railcar airbrake system.

These and additional objects, advantages, features and benefits of the present invention will become apparent from the following specification.

BRIEF DESCRIPTION OF THE DRAWINGS

FIG. 8 is a top view of a railcar airbrake system in accordance with the present invention.

DETAILED DESCRIPTION OF THE PREFERRED EMBODIMENTS

Figure 1:
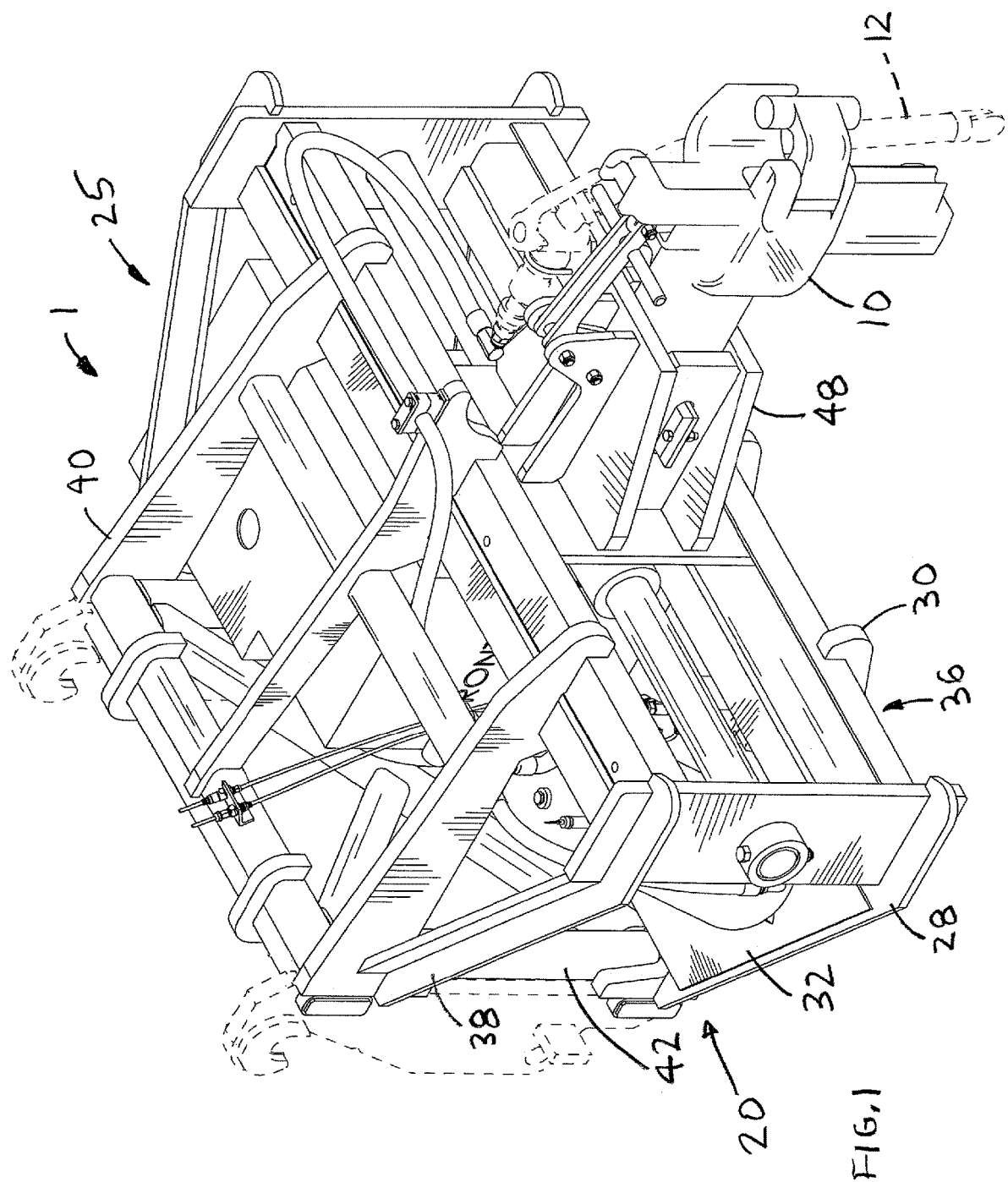
FIG. 1 is a front perspective view of a railcar airbrake system in accordance with the present invention.
Figure 2:
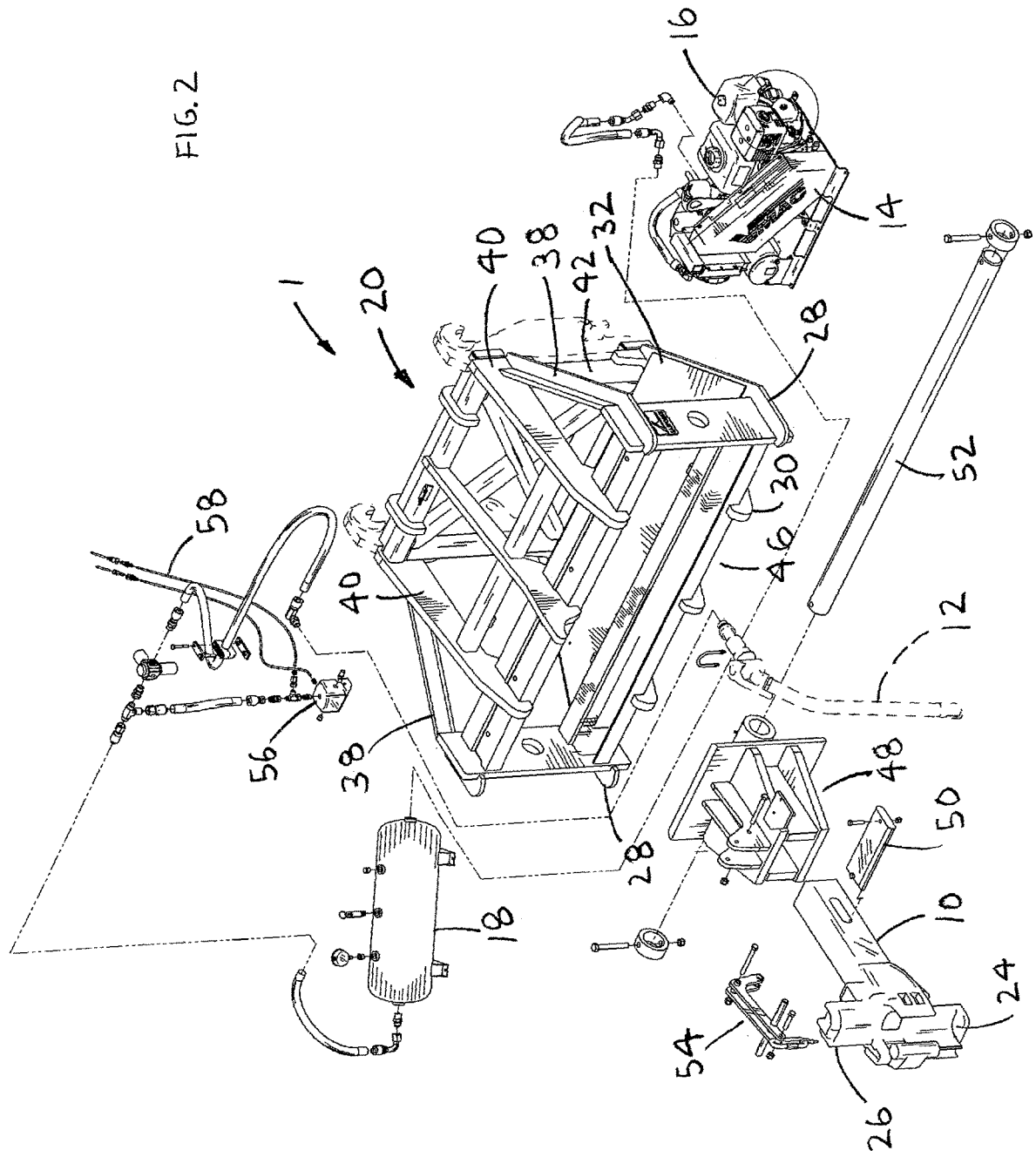
FIG. 2 is a front exploded perspective view of a railcar airbrake system in accordance with the present invention.
Figure 3:
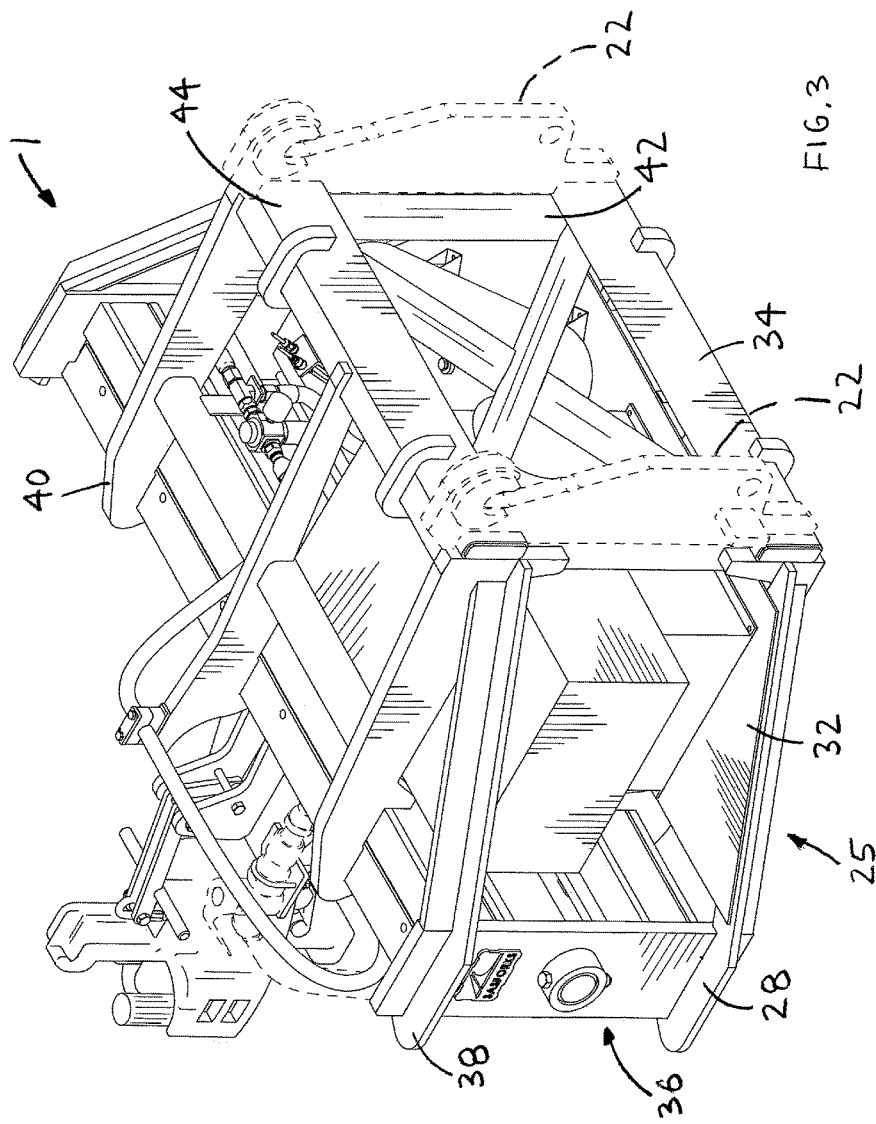
FIG. 3 is a rear perspective view of a railcar airbrake system in accordance with the present invention.

With reference now to the drawings, and particularly to FIG. 1, there is shown a railcar airbrake system 1. With reference to FIGS. 2-3, the railcar airbrake system 1 preferably includes a rail car coupler 10, a glad hand air hose connection 12, a compressor 14, an air storage tank 18, a sliding base frame 20 and a pair quick mount members 22. The rail car coupler 10 includes a lower shelf 24 extending outward from a bottom of the rail car coupler 10 and an upper shelf 26 extending outward from a top of the rail car coupler 10. The upper and lower shelfs 24, 26 prevent vertical disconnection between motorized machinery and a railcar (not shown).

Figure 4:
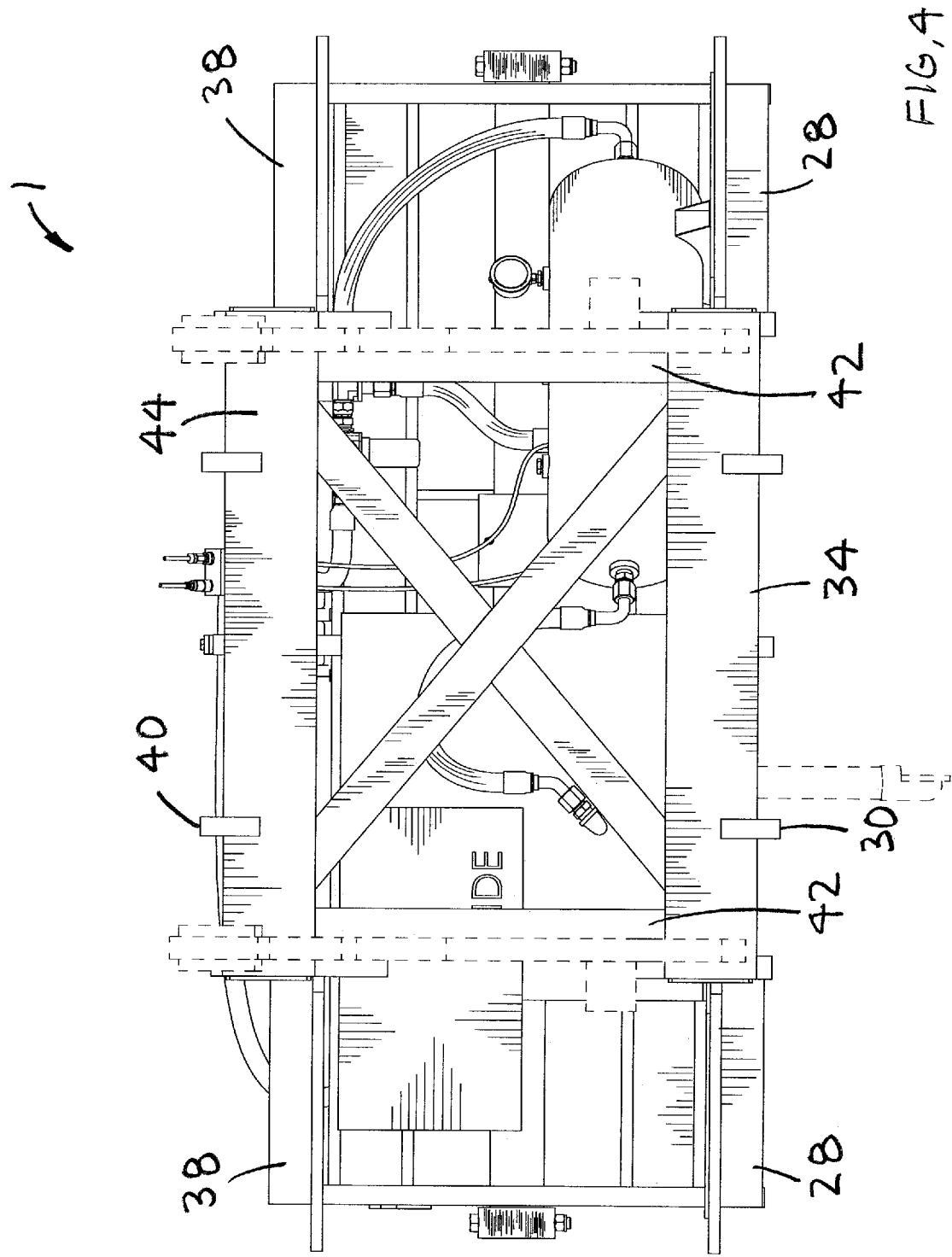
FIG. 4 is a rear view of a railcar airbrake system in accordance with the present invention.
Figure 5:
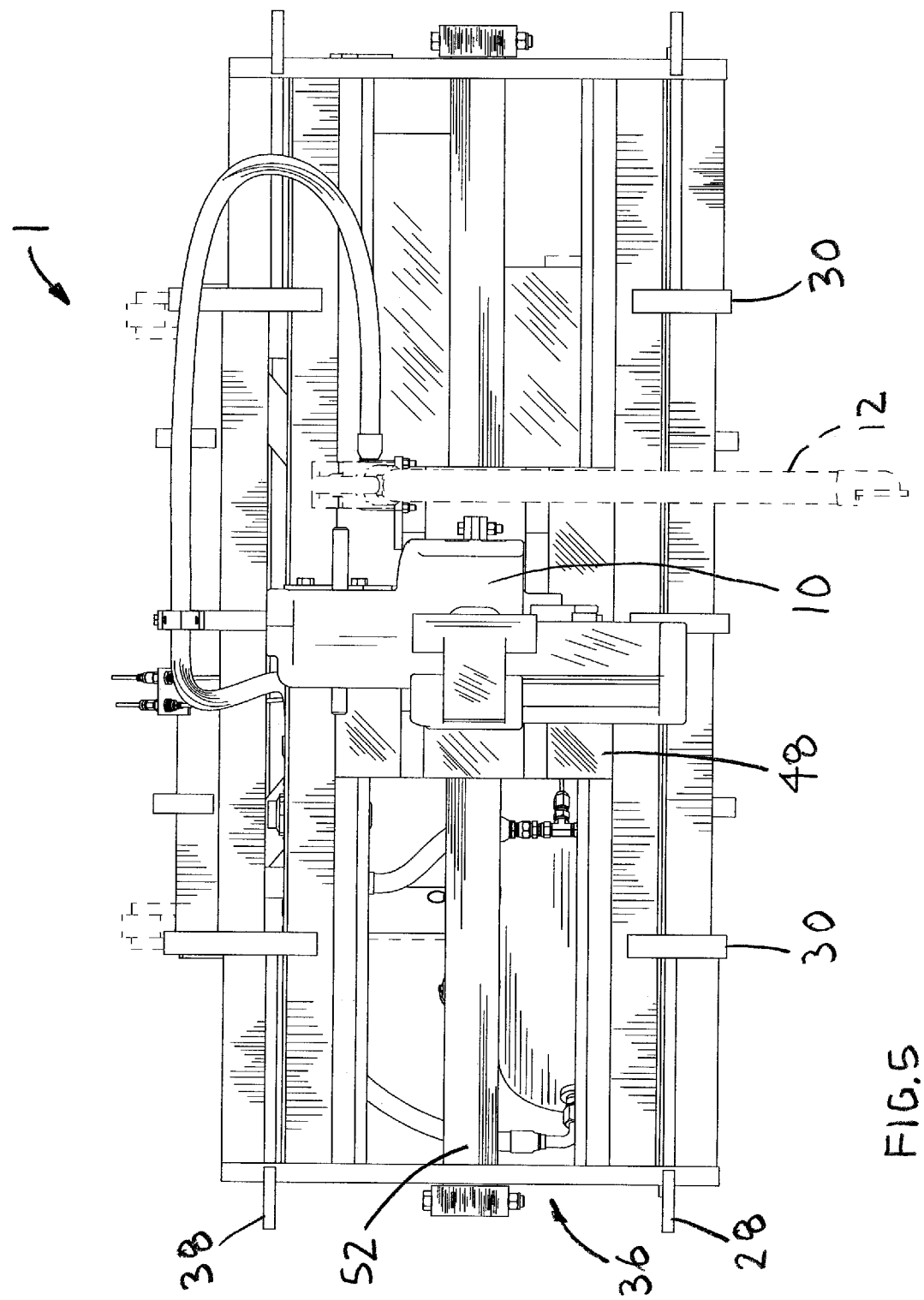
FIG. 5 is a front view of a railcar airbrake system in accordance with the present invention.
Figure 6:
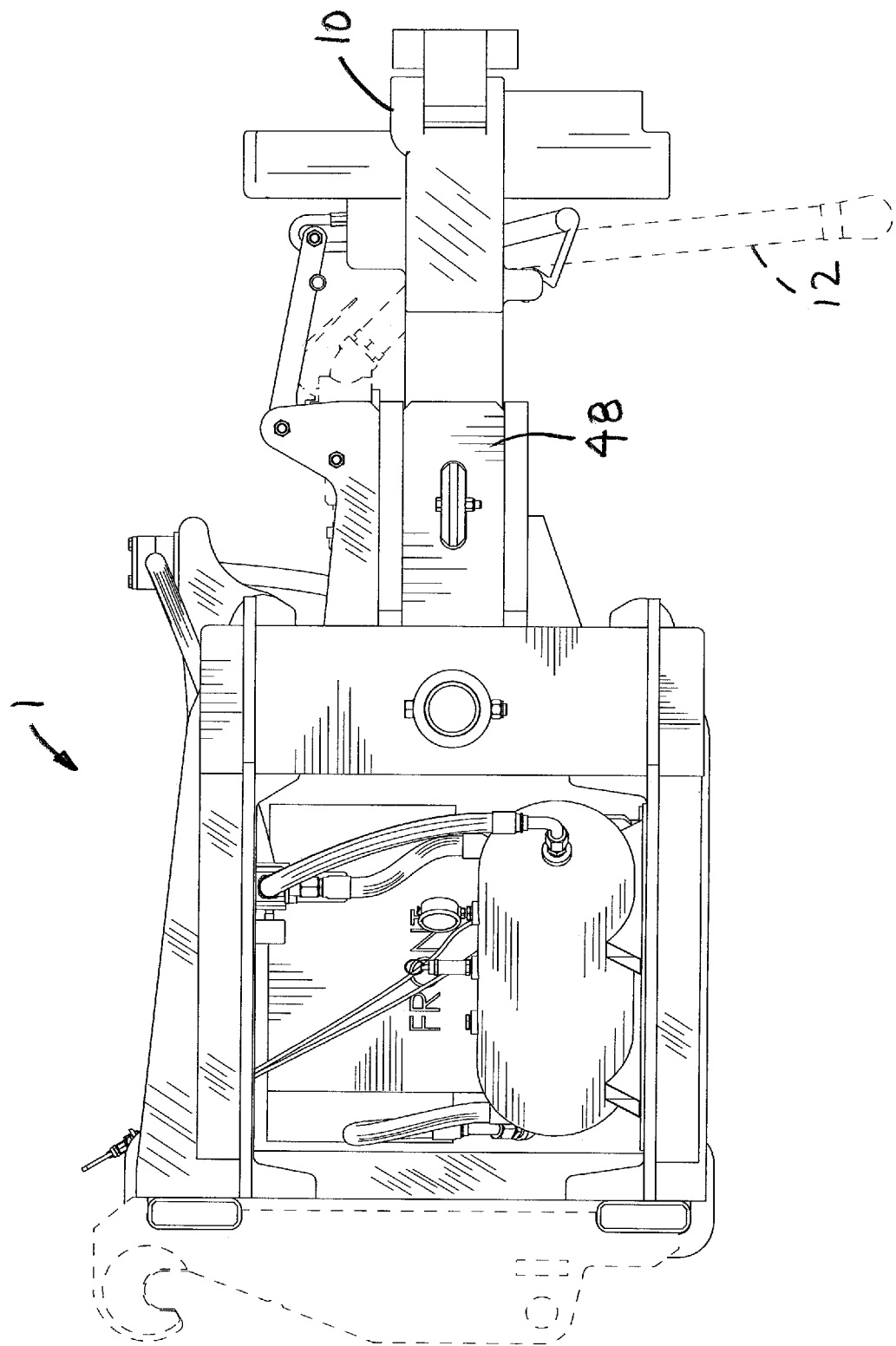
FIG. 6 is a left side view of a railcar airbrake system in accordance with the present invention.
Figure 7:
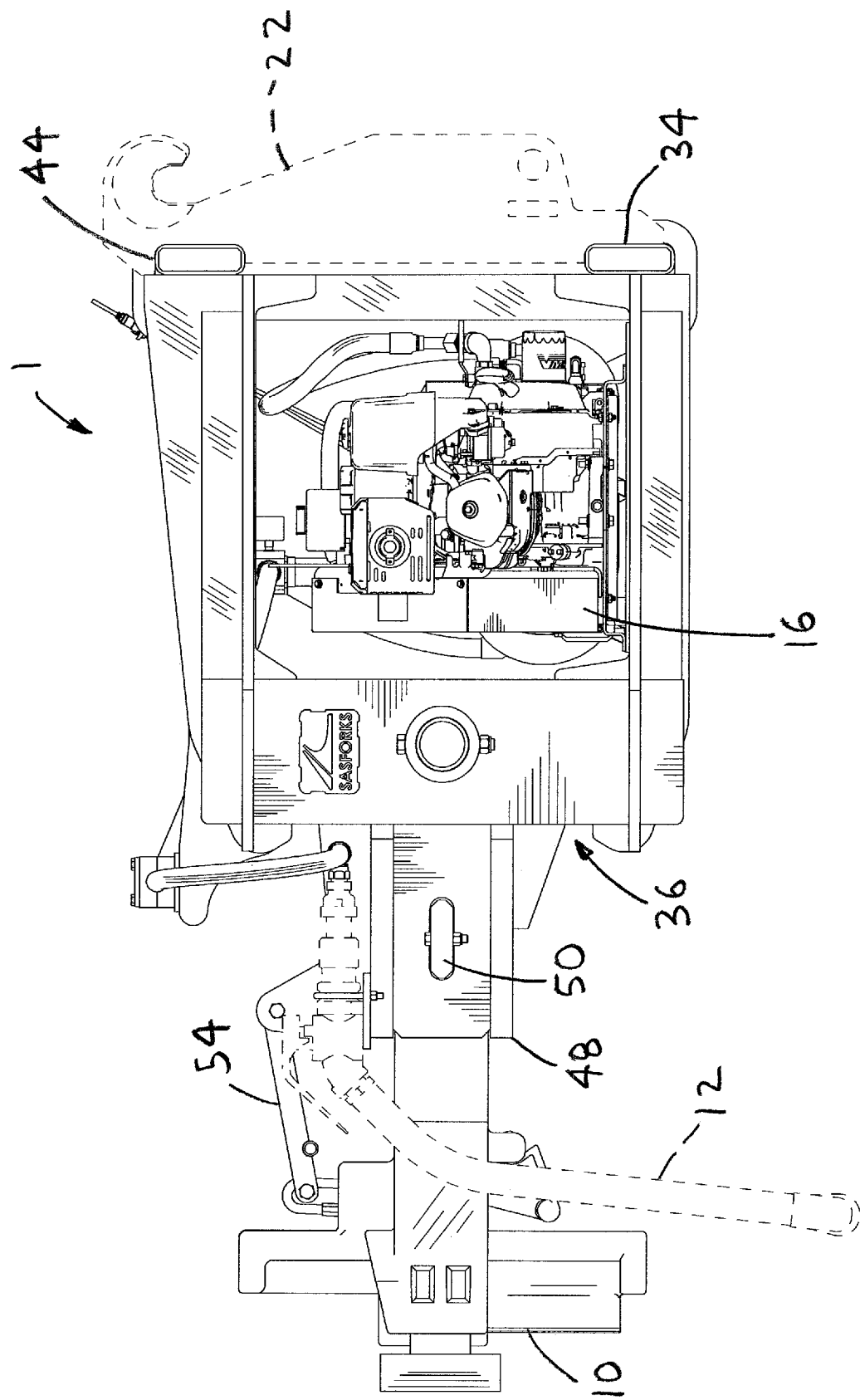
FIG. 7 is a right side view of a railcar airbrake system in accordance with the present invention.

With reference to FIGS. 3-4, the sliding base frame 20 preferably includes a compressor retention structure 25 and a coupler slide device 36. The compressor retention structure 25 is attached to the coupler slide device 36. The compressor retention structure 25 preferably includes a pair of opposing bottom end supports 28, a plurality of bottom supports 30, a base support plate 32, a bottom cross member 34, a pair of opposing top end supports 38, a plurality of top supports 40, a pair of vertical support posts 42; and a top cross member 44. The coupler slide device 36 includes a slide base frame 46, a coupler retainer 48, retention plate 50, a slide shaft 52 and a coupler release 54. The coupler retainer 48 slides left to right along a horizontal axis relative to the slide base frame 46. The rail car coupler 10 and the glad hand air hose connection 12 are retained by the coupler slide device 36.

One end of the plurality of bottom supports 30 are attached to the bottom cross member 34 and one end of the pair of opposing bottom end supports 28 are attached to opposing ends of the bottom cross member 34. An opposing end of the plurality of bottom supports 30 are attached to a bottom of the coupler slide device 36 and an opposing end of the plurality of bottom end supports 28 are attached to opposing ends of the coupler slide device 36. The base support plate 32 is attached to a top of the plurality of bottom supports 30 and the pair of opposing bottom end supports 28. The pair of vertical support posts 42 extend upward from the bottom cross member 34. The top cross member 44 is attached to a top of the pair of vertical support posts 42. One end of the plurality of top supports 40 are attached to the top cross member 44. The pair of quick mount members 22 are attached to a rear of the pair of vertical support posts 42. The pair of quick mount members 22 allow the sliding base frame 20 to be selectively detachable from the machinery (not shown). One end of the pair of opposing top end supports 38 are attached to the end of the plurality of top supports 40 or to opposing ends of the top cross member 44. The opposing ends of the plurality of top supports 40 are attached to a top of the coupler slide device 36 and opposing ends of the pair of opposing top end supports 38 are attached to opposing ends of the coupler side device 36.

The compressor 14 and the air storage tank 18 are secured to the base support plate 32. The compressor 14 includes a compressor motor 16, which rotates the compressor 14. The compressor motor 16 is preferably a self-contained internal compression engine, but other types of drive devices may also be used. The compressor motor 16 does not require a power input from the machinery. The compressor 14 supplies compressed air to the air storage tank 18. The air storage tank 18 supplies compressed air through an outlet to the glad hand air hose connection 12 through a control valve 56. The control valve 56 is preferably operated by a pair of control lines 58. The pair of control lines 58 are manipulated inside a cab of the machinery. The gland hand air hose 12 is actuated via controls in a machinery cab by an operator. The gland hair air hose outputs direct regulated compressed air to unlock the brakes on a railcar, or allow air to flow out of the brakes for locking.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A railcar airbrake system for attachment to machinery, comprising:
   a sliding base frame includes a compressor retention structure and a coupler slide device, said compressor retention structure is attached to said coupler slide device, said coupler slide device includes a coupler retainer which slides along a horizontal axis relative to said coupler slide device;
   an air compressor is retained on said compressor retention structure, said air compressor is self-contained; and
   an air storage tank is retained on said compressor retention structure, said air storage tank stores air from an output of said air compressor, wherein said air storage tank supplies compressed air to a glad hand air hose connection to unlock brakes of a rail car.

2. The railcar airbrake system for attachment to machinery of claim 1 wherein:
   said compression retention structure includes a plurality of bottom supports, a plurality of top supports, a bottom cross member, a top cross member and two vertical posts, said bottom cross member is retained between a bottom of said two vertical posts, said top cross member is retained between a top of said two vertical posts, one end of said plurality of bottom supports are attached to said bottom cross member and the other end of said plurality of bottom supports are attached to said coupler slide device, one end of said plurality of top supports are attached to said top cross member and the other end of said plurality of top supports are attached to said coupler slide device.

3. The railcar airbrake system for attachment to machinery of claim 2 wherein:
   one end of a pair of bottom opposing end supports is attached to a bottom of said two vertical posts, one end of a pair of top opposing end supports is attached to a top of said two vertical posts, an opposing end of said top and bottom opposing end supports are attached to said coupler slide device.

4. The railcar airbrake system for attachment to machinery of claim 1 wherein:
   a rail car coupler includes a lower shelf extending from a bottom of the rail car coupler and an upper shelf extending from a top of the rail car coupler, the rail car coupler is retained in the coupler retainer.

5. The railcar airbrake system for attachment to machinery of claim 1 wherein:
   said air compressor includes a compressor motor, said compressor motor is an internal combustion engine.

6. The railcar airbrake system for attachment to machinery of claim 1 wherein:

the glad hand air hose connection is located in front of said coupler slide device.

7. A railcar airbrake system for attachment to machinery, comprising:
a sliding base frame includes a compressor retention structure and a coupler slide device, said compressor retention structure is attached to said coupler slide device, said coupler slide device includes a coupler retainer which slides along a horizontal axis relative to said coupler slide device;
an air compressor is retained on said compressor retention structure, said air compressor is self-contained;
an air storage tank is retained on said compressor retention structure, said air storage tank stores air from an output of said air compressor; and
a control valve is used to regulate the flow of compressed air from an outlet of said air storage tank, wherein said control valve is remotely controlled inside the machinery, said control valve controls the flow of compressed air to a glad hand air hose connection to unlock brakes of a rail car.

8. The railcar airbrake system for attachment to machinery of claim 7 wherein:
said compression retention structure includes a plurality of bottom supports, a plurality of top supports, a bottom cross member, a top cross member and two vertical posts, said bottom cross member is retained between a bottom of said two vertical posts, said top cross member is retained between a top of said two vertical posts, one end of said plurality of bottom supports are attached to said bottom cross member and the other end of said plurality of bottom supports are attached to said coupler slide device, one end of said plurality of top supports are attached to said top cross member and the other end of said plurality of top supports are attached to said coupler slide device.

9. The railcar airbrake system for attachment to machinery of claim 8 wherein:
one end of a pair of bottom opposing end supports is attached to a bottom of said two vertical posts, one end of a pair of top opposing end supports is attached to a top of said two vertical posts, an opposing end of said top and bottom opposing end supports are attached to said coupler slide device.

10. The railcar airbrake system for attachment to machinery of claim 7 wherein:
a rail car coupler includes a lower shelf extending from a bottom of the rail car coupler and an upper shelf extending from a top of the rail car coupler, the rail car coupler is retained in the coupler retainer.

11. The railcar airbrake system for attachment to machinery of claim 7 wherein:
said air compressor includes a compressor motor, said compressor motor is an internal combustion engine.

12. The railcar airbrake system for attachment to machinery of claim 7 wherein:
the glad hand air hose connection is located in front of said coupler slide device.

13. A railcar airbrake system for attachment to machinery, comprising:
a sliding base frame includes a compressor retention structure and a coupler slide device, said compressor retention structure is attached to said coupler slide device, said coupler slide device includes a coupler retainer which slides along a horizontal axis relative to said coupler slide device, said compressor retention structure includes a base support plate;
a pair of quick mount members extend from a rear of said compression retention structure;
an air compressor is retained on said base support plate, said air compressor is self-contained; and
an air storage tank is retained on said base support plate, said air storage tank stores air from an output of said air compressor, wherein said sliding base frame is selectively detachable from the machinery with said pair of quick mount members, said air storage tank supplies compressed air to a glad hand air hose connection to unlock brakes of a rail car.

14. The railcar airbrake system for attachment to machinery of claim 13 wherein:
said compression retention structure includes a plurality of bottom supports, a plurality of top supports, a bottom cross member, a top cross member and two vertical posts, said bottom cross member is retained between a bottom of said two vertical posts, said top cross member is retained between a top of said two vertical posts, one end of said plurality of bottom supports are attached to said bottom cross member and the other end of said plurality of bottom supports are attached to said coupler slide device, one end of said plurality of top supports are attached to said top cross member and the other end of said plurality of top supports are attached to said coupler slide device.

15. The railcar airbrake system for attachment to machinery of claim 14 wherein:
one end of a pair of bottom opposing end supports is attached to a bottom of said two vertical posts, one end of a pair of top opposing end supports is attached to a top of said two vertical posts, an opposing end of said top and bottom opposing end supports are attached to said coupler slide device.

16. The railcar airbrake system for attachment to machinery of claim 13 wherein:
a rail car coupler includes a lower shelf extending from a bottom of the rail car coupler and an upper shelf extending from a top of the rail car coupler, the rail car coupler is retained in the coupler retainer.

17. The railcar airbrake system for attachment to machinery of claim 13 wherein:
said air compressor includes a compressor motor, said compressor motor is an internal combustion engine.

18. The railcar airbrake system for attachment to machinery of claim 13 wherein:
the glad hand air hose connection is located in front of said coupler slide device.

\* \* \* \* \*